(12) United States Patent
Burton et al.

(10) Patent No.: US 7,352,763 B2
(45) Date of Patent: Apr. 1, 2008

(54) DEVICE TO RECEIVE, BUFFER, AND TRANSMIT PACKETS OF DATA IN A PACKET SWITCHING NETWORK

(75) Inventors: Tom E. Burton, Beaverton, OR (US); Dominic J. Gasbarro, Forest Grove, OR (US); Brian M. Leitner, Hillsboro, OR (US); Dean S. Susnow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 10/761,394

(22) Filed: Jan. 20, 2004

(65) Prior Publication Data

US 2004/0151176 A1 Aug. 5, 2004

Related U.S. Application Data

(62) Division of application No. 09/603,957, filed on Jun. 26, 2000, now Pat. No. 6,778,548.

(51) Int. Cl.
*H04L 12/56* (2006.01)
*H04L 29/06* (2006.01)
*H05L 12/28* (2006.01)

(52) U.S. Cl. .................. 370/412; 370/360; 370/389; 370/395.54; 709/250

(58) Field of Classification Search ............... 370/360, 370/386, 389, 395.54, 395.7, 412, 429, 392, 370/395.51; 709/212, 250
See application file for complete search history.

(56) References Cited

U.S. PATENT DOCUMENTS 5,598,541 A * 1/1997 Malladi ..................... 710/106

* cited by examiner

*Primary Examiner*—Afsar Qureshi
(74) *Attorney, Agent, or Firm*—Blakely, Sokoloff, Taylor & Zafman LLP

(57) ABSTRACT

A device to create, receive, and transmit packets of data in a packet switching network. This device employs a direct memory access packet controller which would interface between memory contained within a computer system and a packet switched network. This direct memory access packet controller would utilize one or more micro-engines that would dynamically allocate buffer space to process received packets of data. This direct memory access packet controller would further utilize a transmit cell FIFO circuit to allocate buffer space to packets being transmitted. In addition, a sequencer would act to control the workflow of packets being received and transmitted.

5 Claims, 8 Drawing Sheets

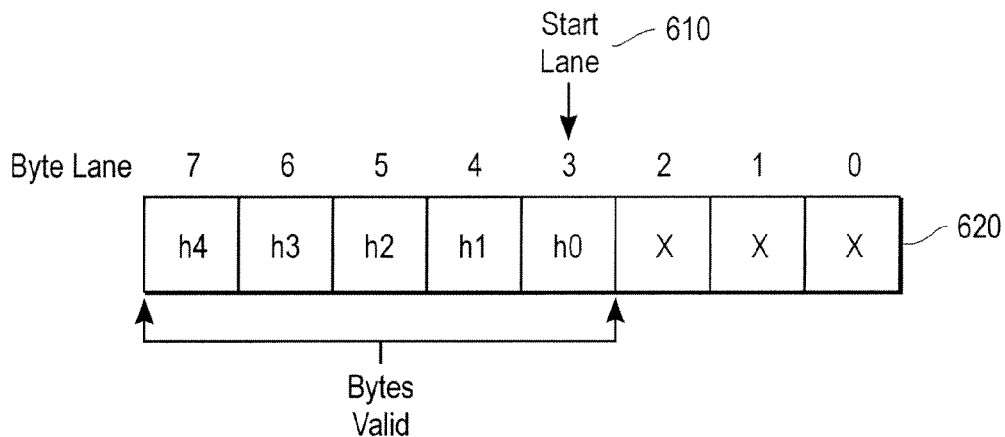
FIG. 5A  Host Data
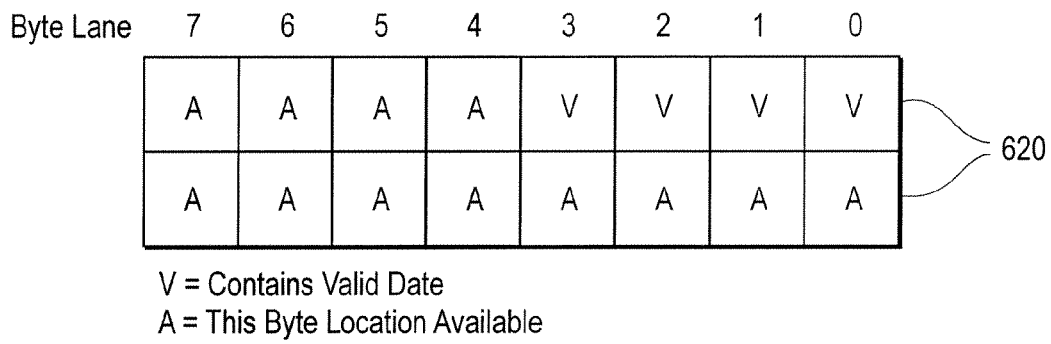
V = Contains Valid Date
A = This Byte Location Available
FIG. 5B  Cell Buffer before Host Read
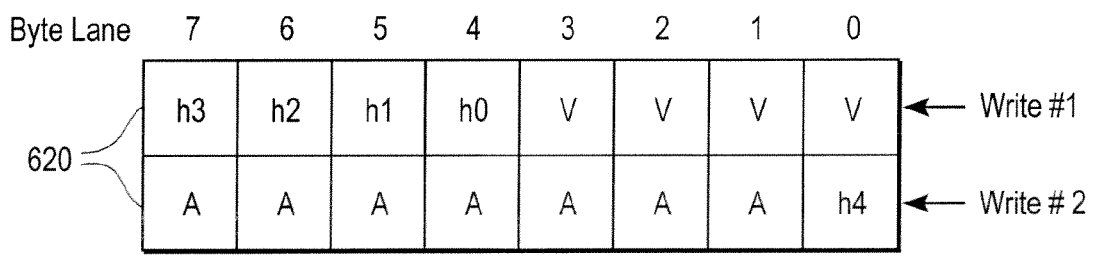
FIG. 5C  Cell Buffer after Host Read

DEVICE TO RECEIVE, BUFFER, AND TRANSMIT PACKETS OF DATA IN A PACKET SWITCHING NETWORK

CROSS-REFERENCE TO RELATED APPLICATIONS

The subject application is a divisional of parent U.S. patent application Ser. No. 09/603,957 filed Jun. 26, 2000 now U.S. Pat. No. 6,778,548, entitled "Device To Receive, Buffer, and Transmit Packets Of Data In A Packet Switching Network."

FIELD

The invention relates to a device to receive, buffer, and transmit packets of data in a packet switching network.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. In addition, separate computer systems were linked together through different communications mechanisms such as, shared memory, serial and parallel ports, local area networks (LAN) and wide area networks (WAN). However, these mechanisms have proven to be relatively slow and subject to interruptions and failures when a critical communications component fails.

One type of architecture of many that has been developed to improve throughput, allow for parallel processing, and to some extent, improve the robustness of a computer network is called a hypercube. Hypercube is a parallel processing architecture made up of binary multiples of computers (4, 8, 16, etc.). The computers are interconnected so that data travel is kept to a minimum. For example, in two eight-node cubes, each node in one cube would be connected to the counterpart node in the other. However, when larger numbers of processors and peripheral devices are included in the network, connecting each node, which includes processors and peripheral devices, to all other nodes is not possible. Therefore, routing tables for data must be established which indicate the shortest path to each node from any other node.

A hypercube like architecture, and many other types of networks and computer architectures, work well but are rigid in their designs. For example, if a system is needed that has ten processors in it, then one must configure the hypercube with sixteen processors. Further, no provision is made for interfacing to several local area networks, wide area networks, and different types of input/output (I/O) controllers. Therefore, hypercube may be well suited for processor intensive application, but is ill suited for a communications network.

More recently, several different types of packet switching networks have been created in order to facilitate communications amongst computer systems. Two similar packet switched systems include next generation input/output (NGIO) and InfiniBand. Both NGIO and InfiniBand are highly flexible computer architectures in which any number of computer systems may communicate to each other and to any number of local area networks, wide area networks, and peripheral devices. Both NGIO and InfiniBand utilize serial communications equipment and switches that have minimum transfer rates of up to 2.5 gigabit per second (Gbps).

However, in order to achieve a one plus Gbps transfer rate along with a highly flexible connectivity capability the communications controllers and switches must be relatively sophisticated, complex and expensive devices. In particular, these communications controllers and switches must contain multiple buffers per port to act as temporary storage areas. In order to achieve the necessary high throughput rates it is preferable that both the logic and memory required for these controllers and switches occupy a single chip. However, in order to be able to support full-duplex communication at least two memory storage areas are required. In order to fill one buffer from one port while transmitting to another port, it may be necessary to have up to four buffers in order to accomplish a simultaneous read and write. However, handling simultaneous reads and writes from different ports with different buffers being filled and emptied at different rates requires large amounts memory and significantly complex logic.

Therefore, what is needed is a device that will minimize the complexity and logic involved in performing simultaneous reads and writes to multiple ports in a packet switching network. This device should also minimize the number of buffers needed to perform simultaneous reads and writes to different ports. It should further minimize the amount of memory needed by each buffer. Further, it should try to utilize, the maximum extent possible, each buffer's memory space so that none is wasted. In addition, the logic utilized by this device should be simple and thus require the minimum amount of space on a chip. A significant cost savings should be seen using this device since the minimum amount of memory required is being utilized and the logic required also takes up the minimal amount of space on a chip. Thus, this device should enable the efficient and rapid transport of packets in a network.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings, wherein:

FIG. 5 is an example of the byte alignment performed by the cell buffer byte alignment logic circuit, shown in FIG. 4, as used in the example embodiments of the present invention;

DETAILED DESCRIPTION

Figure 1:
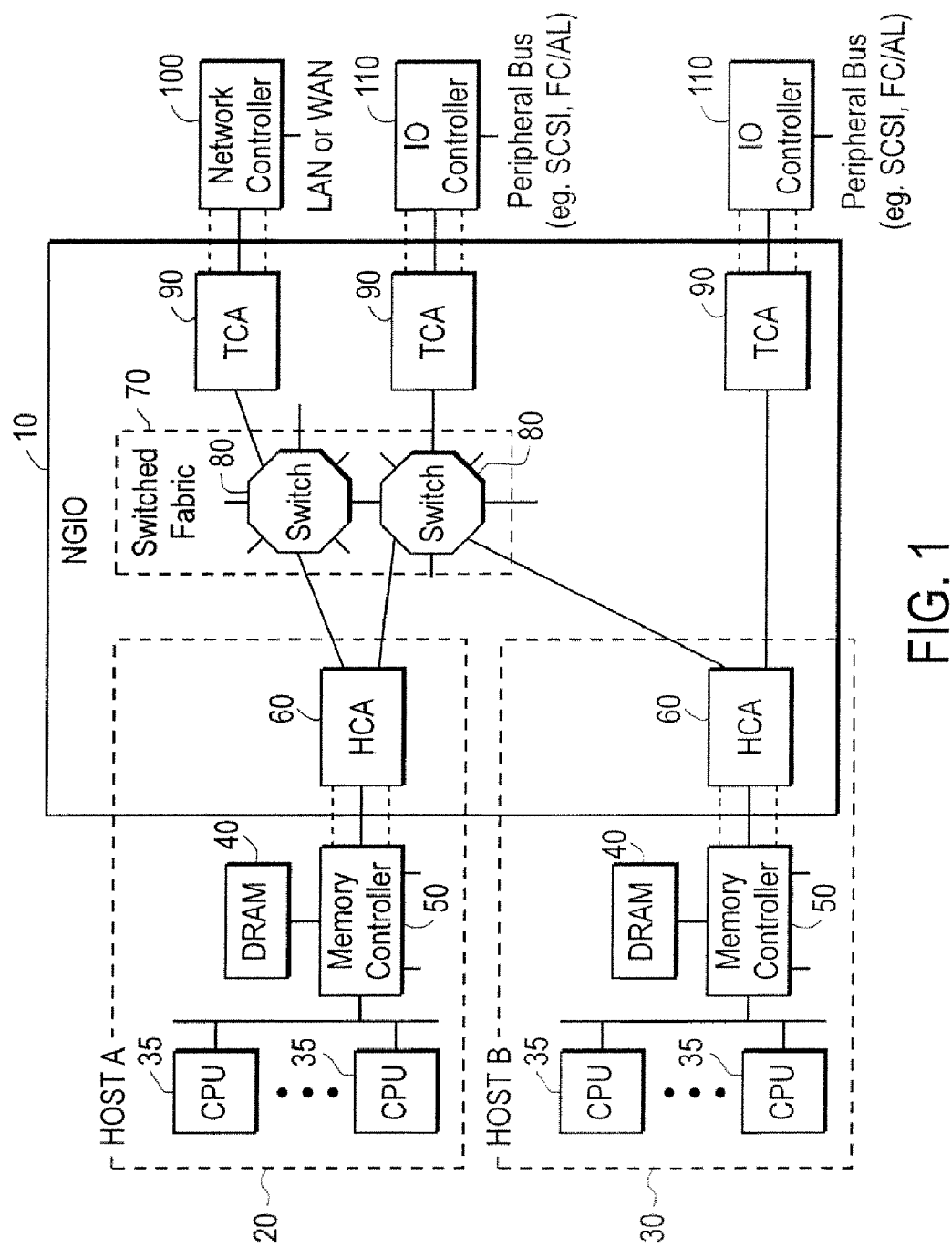
FIG. 1 is an example of an overall Next Generation Input/Output (NGIO) systems diagram.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGs. for simplicity of illustration and discussion, and so as not to obscure the invention.

The present invention is directed to a device to create, process and transfer packets of information from one device to another. This device has several micro-engines to receive payload data from a memory controller. The micro-engines determine if a task is available to process the payload data and assign a task to the buffer or the payload is stored. This device also has a transmit cell first in first out (FIFO) circuit adapted to build a packet header based on data received from the micro-engines payload from the memory controller. The micro-engines used the transmit cell FIFO 240 to build a complete packet having a packet header and payload. The packet is transmitted when all of the payload data has been received. The micro-engines can immediately began the construction of a new packet when a predetermined amount of payload data has been transferred out of the buffer.

FIG. 1 is an example of an overall Next Generation Input/Output (NGIO) 10 systems diagram which may be used by the embodiments of the present invention. However, it should be noted that the embodiments of the present invention are not limited to usage on an NGIO system. The embodiments of the present invention may also be used on an InfiniBand system or any other package switched communications system. Thus, all references to NGIO 10 are by way of example only and are not intended to limit the present invention as recited in the claims. Using such an NGIO 10 architecture it may be possible to link together a processor based system 20, through switches 80 to several Input/Output (I/O) controllers 110, network controllers 100, and other processor based systems 30. Each processor based system 20 and 30 may be composed of one or more central processing units (CPU) 35, dynamic random access memory (DRAM) 40, memory controller 50 and a host channel adapter (HCA) 60. A switching fabric 70 may be used to interconnect serial ports to achieve transfer rates of more than 2.5 gigabit-per-second.

Referring to FIG. 1, the NGIO 10 channel architecture defines interfaces that move data between two "memory" regions or nodes. Access to any I/O unit, such as I/O controller 110 and network controller 100, may be accomplished by send or receive operations, as well as, remote direct memory access (RDMA) read and RDMA write operations. Cluster or channel adapters provide the control and logic that allows nodes to communicate to each other over NGIO 10. There are two types of channel or cluster adapters. The first may be a host channel adapter (HCA) 60 and second may be a target channel adapter (TCA) 90. The embodiments of the present invention have been implemented on the HCA 60. However, the embodiments of the present invention may also be implemented on the TCA 90 and switch 80 or any other device that serves to transfer a packet of information from one device to another.

Still referring to FIG. 1, a processor based system 20 or 30 may have one or more HCAs 60 connected to it. Further, a network controller 100, and an I/O controller 110 may have one or more target channel adapters (TCA) 90 connected to it. Communications in a NGIO 10 architecture may be accomplished through these cluster adapters (HCA 60 or TCA 90) directly or through switches 80.

As can be seen in FIG. 1, the NGIO 10 architecture enables redundant communications links between HCAs 60, switches 80 and TCAs 90. Further, it may be possible to create a routing and distance table to identify the shortest paths between nodes in the network. In this case, distance is defined as being the shortest time between points and not the physical distance. A node or cluster adapter may be either a HCA 60 or a TCA 90. Therefore, when data is sent to a memory location in a node it will take the shortest path available and arrive as fast as possible. However, if a failure occurs to a switch 80 then an alternate path may have to be configured and the distance table would have to be computed again.

Figure 2:
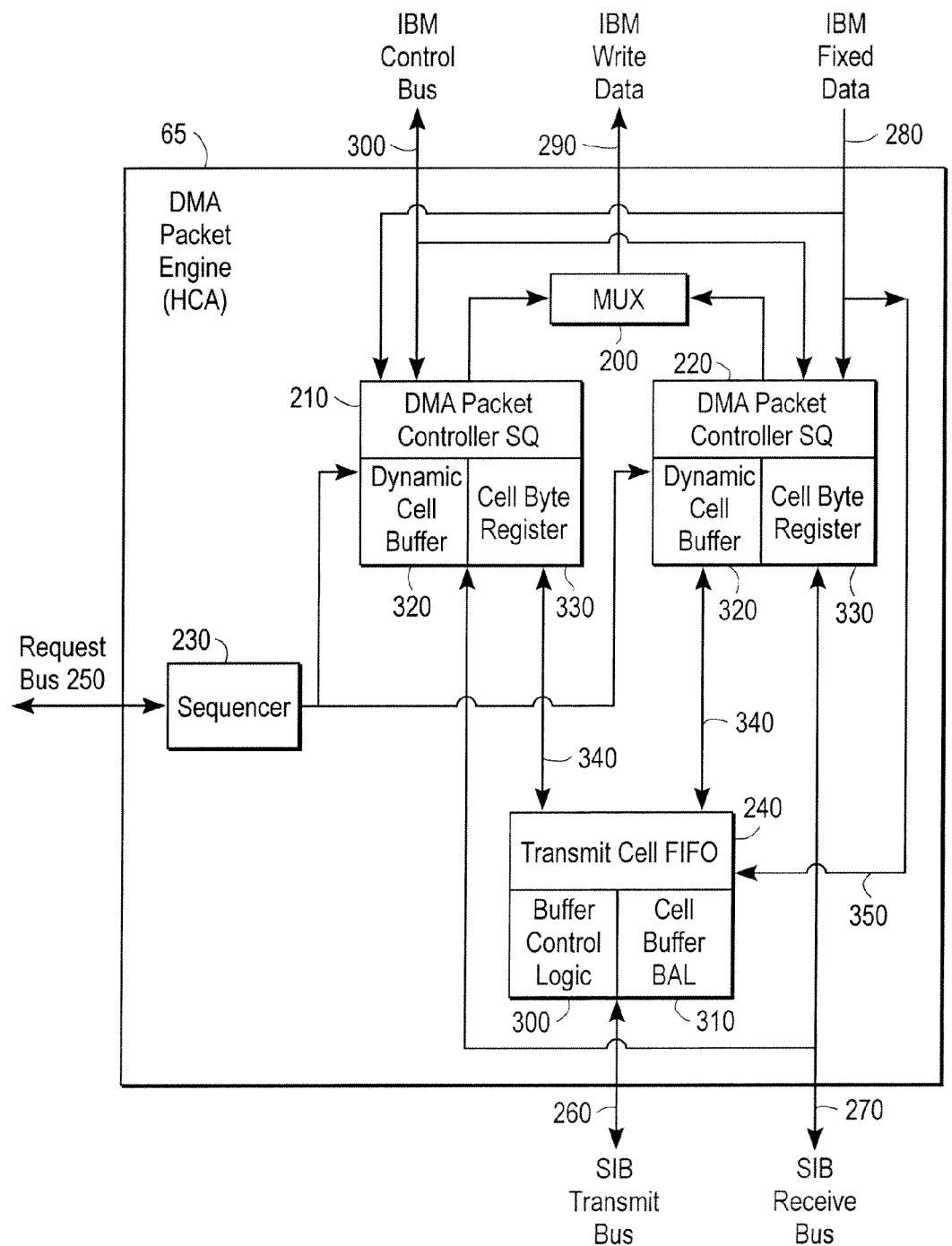
FIG. 2 illustrates a portion of a host channel adapter (HCA) having a direct memory access (DMA) packet controller used in the example embodiments of the present invention.

FIG. 2 illustrates a portion of a host channel adapter (HCA) 60 referred to as a direct memory access (DMA) packet engine 65 used in the example embodiments of the present invention. It should be emphasized that the DMA packet engine 65 only makes up a small portion of either the HCA 60, TCA 90 or switch 80 or any other device that serves to transfer packets of information from one device to another. The DMA packet engine 65 communicates indirectly to the memory controller 50, shown in FIG. 1, through the in-bound multiplexer (IBM) bus 300 in which control information may be passed back and forth between HCA 60 and memory controller 50. IBM write data 290 may be utilized to write data to DRAM 40 through memory controller 50 from HCA 60. In turn, IBM fixed data 280 may be used to receive data from memory controller 50, shown in FIG. 1. The DMA packet engine 65 transmits and receives data to a switch 80 or TCA 90, shown in FIG. 1, via serial interface block (SIB) transmit bus 260 and a SIB receive bus 270. Transmit cell FIFO (TCF) 240 may be utilized to communicate to either switch 80 or TCA 90 via SIB transmit bus 260. Further, the TCF 240 interfaces to two micro-engines referred to as DMA packet controller send queue (SQ) 210 and DMA packet controller receive queue (RQ) 220. The function of the TCF 240 is to assemble a packet using the header from the DMA packet controller RQ 220 or SQ 210 and the payload data from the memory controller 50. The payload 920 portion (FIG. 7) of the packet may be typically received from memory controller 50. In order for this and other functions to be performed, TCF 240 contains a buffer control logic 300 and a cell buffer byte alignment logic (BAL) 310. The buffer control logic 300 is discussed in further detail in reference to FIG. 3. The cell buffer BAL 310 is discussed in further detail in reference to FIG. 4.

Still referring to FIG. 2, two micro-engines are provided, as discussed earlier, that are the DMA packet controller SQ 210 and DMA packet controller RQ 220. These two micro-engines are effectively identical except one transmits data requests and receives responses, DMA packet controller SQ 210, while the other transmits responses and receives requests, DMA packet controller RQ 220. The micro-engines communicate to the TCF 240 via a buses 340. It should also be noted that TCF 240 also may receive data indirectly from memory controller 50 via bus 350. Both micro-engines have a dynamic cell buffer 320 and a cell byte register 330. Further, each micro-engine contains within it two separate buffers which are used as temporary storage for data being received from memory controller 50, switch 80 or TCA 90. The operation of the dynamic cell buffer 320 will be discussed in further detail in reference to FIG. 6. Also, the operation the cell byte register 330 will be discussed in further detail in reference to FIG. 8.

Still referring to FIG. 2, a multiplexer (MUX) 200 may be utilized by the memory controller 50 to select either DMA packet controller SQ 210 or DMA packet controller RQ 220 for receipt of data through bus 290. A sequencer 230 connected to a request bus 250 may be utilized to determine if a buffer is available and assign a micro-engine task to process the packet upon reception of a packet. The activities of the sequencer 230 will be discussed in further detail in reference to FIG. 5 and FIG. 6.

Figure 3:
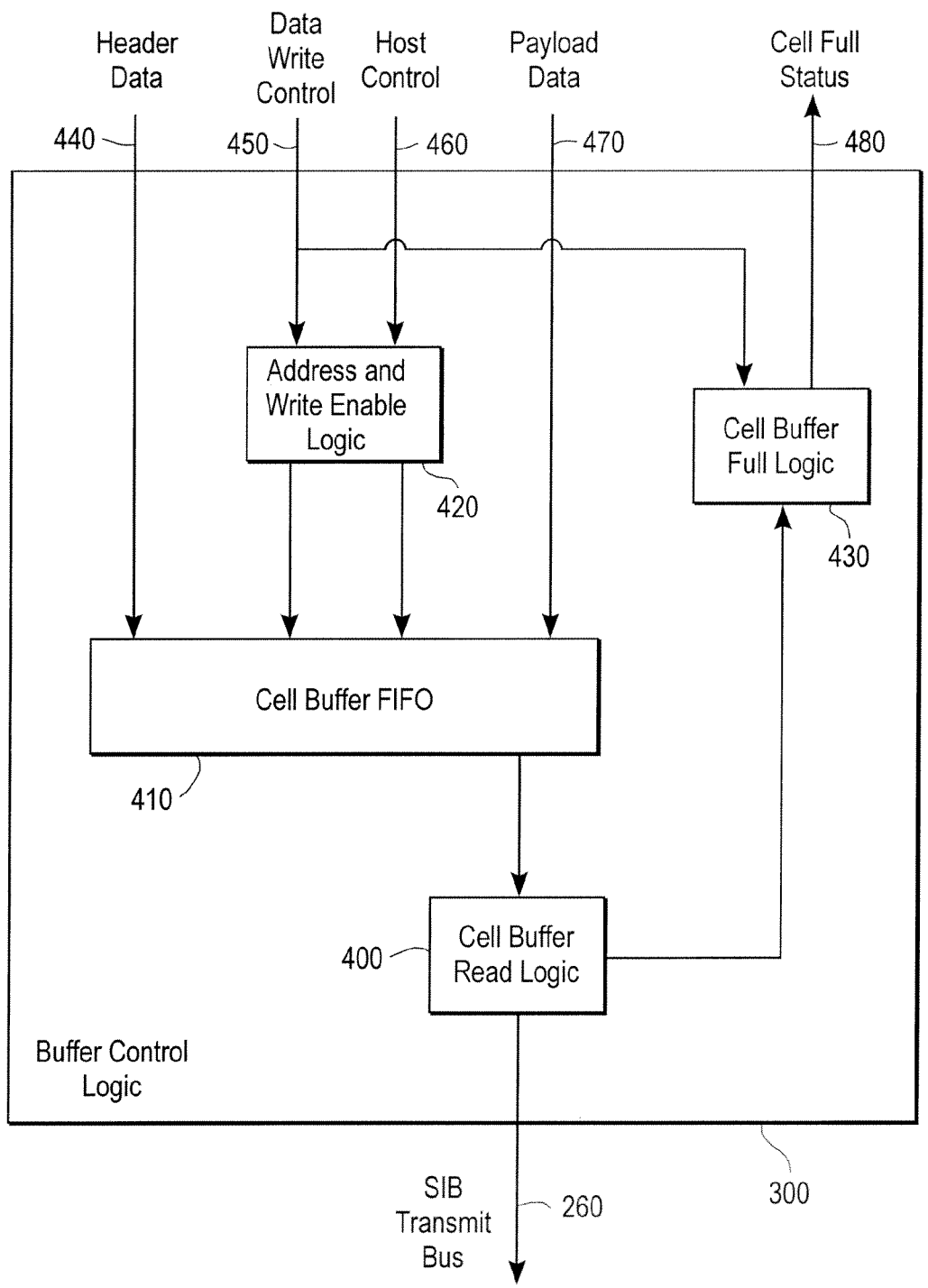
FIG. 3 is an example of a buffer control logic circuit found in the DMA packet engine, shown in FIG. 2, as used in the example embodiments of the present invention.

FIG. 3 illustrates a buffer control logic circuit 300 found in the TCF 240 of the DMA packet engine 65, shown in FIG. 2. The TCF 240 enables the two micro-engines (either the DMA packet controller SQ 210 or the DMA packet controller RQ 220) to build two packets simultaneously in a single buffer while reading from the same buffer. A packet is a collection of control or header data 800 and payload data 920, shown in FIG. 7, that makes up the lowest level of messaging in an input/output (I/O) protocol. This architecture builds a complete packet, shown in FIG. 7, in cell buffer first in first out (FIFO) 410 which is a temporary storage location before the data is transmitted. To build the packet the header data 800 may be generated first by one of the two micro-engines (either the DMA packet controller SQ 210 or the DMA packet controller RQ 220). The header data 800 may be transmitted to the buffer control logic 300 via buses 340 which has four buses including a header data bus 440, a data write control bus 450, a host control bus 460 and a payload data bus 470. Specifically, the header data 800 may be transmitted across header data bus 440 and the payload data 920 may be transmitted across payload data bus 470 and may come from the memory controller 50. After both the header data 800 and the payload data 920 have been put into the cell buffer FIFO 410, the packet may be read out and transmitted.

Still referring to FIG. 3, since the cell buffer FIFO 410 may receive data from both memory controller 50 and one of the micro-engines, DMA packet controller SQ 210 or DMA packet controller RQ 220, it may be necessary to provide an address and write enable logic 420 circuit to synchronize data from the different sources. This may be necessary since the memory controller 50 and the micro-engines may operate on different clock frequencies. Therefore, the address and write enable logic 420 circuit acts to synchronize data from these two different sources. In addition, the packet containing header data 800 and payload data 920 may be transmitted through cell buffer read logic 400 and then to serial interface bus (SIB) transmit bus 260. The cell buffer read logic 400 may also serve to signal the cell buffer full logic 430 circuit that some finite number of bytes in a packet have been transmitted. This finite number of bytes is typically set at eight. However, the finite number of bytes may be set to any number desired. In this manner, the cell buffer full logic 430 circuit may then indicate that a buffer in cell buffer FIFO 410 is available for receipt of data from either the micro-engines or the memory controller 50 for the subsequent packet. More specifically, cell full status bus 480 may be set when the first byte of the header 800 is written to the buffer in the cell buffer FIFO 410. At that point, the buffer is dedicated to this packet and cannot be overwritten until the packet is completed or aborted. The cell full status bus 480 may be cleared when the first byte is read out to the SIB transmit bus 260 using the cell buffer read logic 400. The SIB transmit bus 260 reads or transmits one line or eight bytes at a time and reads the data at the same clock rate as the micro-engine. This reading is therefore sufficiently fast enough to stay ahead of the write pointer allowing the building of a new packet to start immediately.

It should be noted that it is possible to place two cell buffer FIFO 410 units in each buffer control logic 300 with each interfacing to one of the micro-engines. However, in order to simplify the drawing only a single cell buffer FIFO 410 is illustrated in FIG. 3. More specifically, the cell buffer FIFO 410 may be one asynchronous memory that has three ports (not shown) and can hold two packets one for each task executing on a micro-engine. Thus, a micro-engine task can be writing header data 800 into one cell buffer of cell buffer FIFO 410 while another micro-engine task or memory controller 50 may be writing data to a partition in the same cell buffer. Each task of a micro-engine has its own buffer assigned to it and there may be a separate address pointer for each of the buffers. This allows each task to build header data 800 and keep track of the pointer for that buffer. Each buffer also has a host or memory controller 50 address pointer for each task. Payload data 920 from the host or memory controller 50 has signaling bits (not shown) that return with the data telling cell buffer FIFO 410 which buffer and which micro-engine task the data may be assigned to. Also, using the cell buffer read logic 400 and cell buffer full logic 430, it may be also possible to transfer a packet from a buffer while building a new packet in the same buffer.

Still referring to FIG. 3, the cell buffer full logic 430 circuit may be utilized to indicate that a particular cell is unavailable to be written to. When a buffer within cell buffer FIFO 410 begins to be written to as indicated by data write control bus 450, the cell buffer full logic 430 transmits a signal over cell full status bus 480 to one of the micro-engines to indicate that the particular buffer is no longer available.

Using the buffer control logic 300, shown in FIG. 3, allows the micro-engines to assemble the header data 800 and payload data 920 to the cell buffer FIFO 410 before passing it to the SIB transmit bus 260. The packet may now be transferred to the SIB transmit bus 260 in its entirety without the SIB transmit bus 260 having to wait for additional data.

Still referring to FIG. 3, coordination between memory controller 50 and a micro-engine occurs using an address passing mechanism employing data write control bus 450 from the micro-engine. The micro-engine may write the header data 800 to the cell buffer FIFO 410 first. When the micro-engine is finished, it will assert a control signal (not shown) that passes the next available location in the cell buffer FIFO 410 to the host address pointer (not shown). At that point the micro-engine may no longer write to this particular buffer since it has passed control to memory controller 50. Then memory controller 50 transmits payload data 920 via payload data bus 470.

Figure 4:
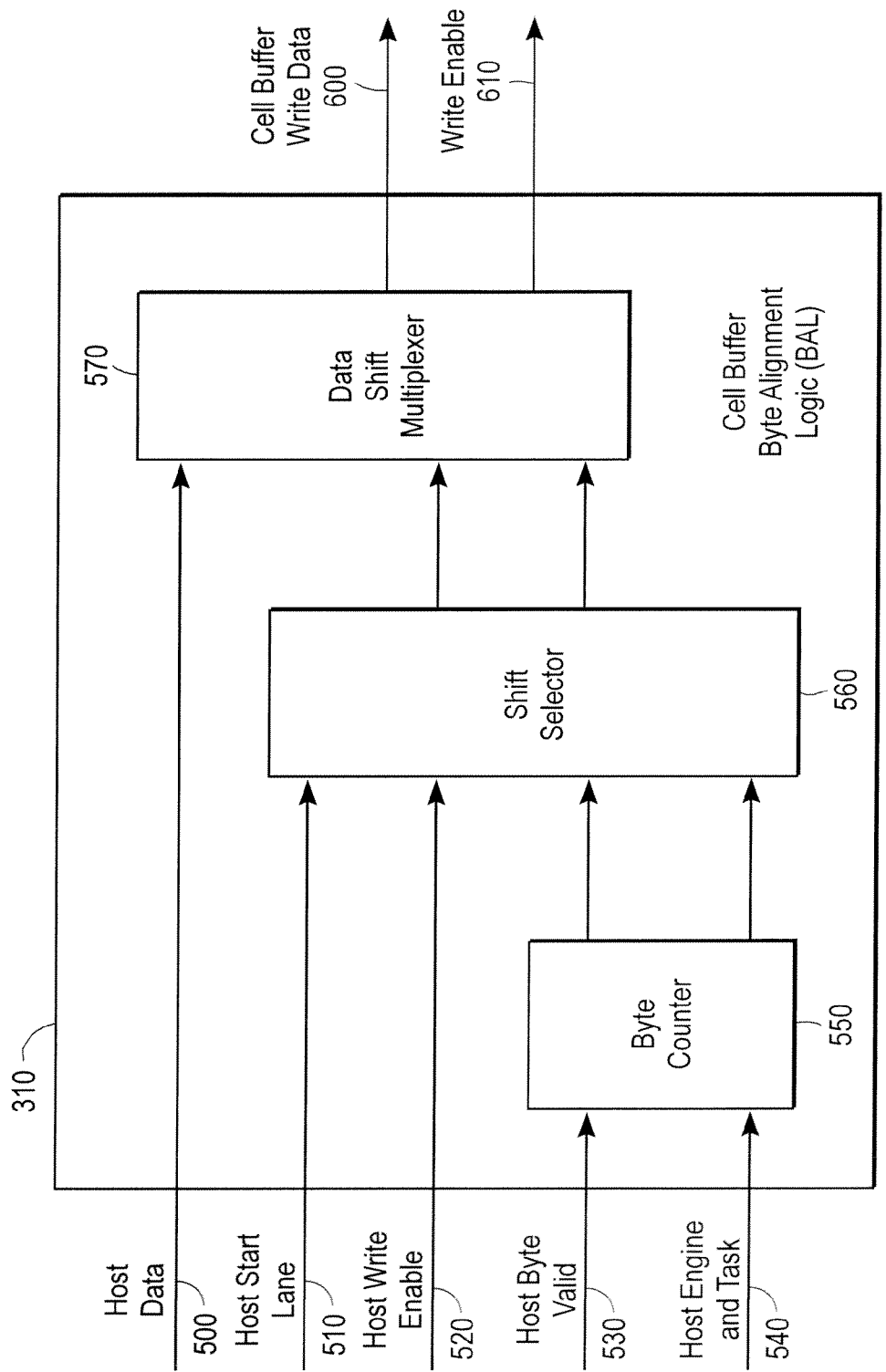
FIG. 4 is an example of a cell buffer byte alignment logic (BAL) circuit as found in the DMA packet engine, shown in FIG. 2, in an example embodiment of the present invention.

FIG. 4 is an example of a cell buffer byte alignment logic (BAL) 310 circuit as found in the TCF 240 of the DMA packet engine 65, shown in FIG. 2, in an example embodiment of the present invention. The cell buffer BAL 310 circuit may serve to align or shift data being received from the host or memory controller 50 so that the data may be placed in the proper location in the buffer contained within the cell buffer FIFO 410. This may be necessary, as illustrated by the example shown in FIGS. 5A, 5B, and 5C, in which data from the host or memory controller 50 does not arrive in the proper alignment for the buffer in cell buffer FIFO 410. This misalignment may occur for numerous reasons. For example, since data is transferred in eight byte increments, byte data of interest may start in the middle of the eight byte segment or increment. Further, as previously discussed, a given buffer in the cell buffer FIFO 410 may be partitioned to handle separate reads and writes in a packet switching network. Therefore, the first available byte location or byte lane may not necessarily begin on an eight byte boundary. It should be noted that the present invention is not limited to transferring data segments in lengths of eight-bytes. The usage of eight byte transfer segment is strictly arbitrary and may vary according to the design selected. The byte alignment examples shown in FIGS. 5A, 5B, and 5C will be discussed in further detail ahead.

Referring to FIG. 4, the cell buffer BAL 310 may take payload data 920 from host or memory controller 50 and write it to the correct buffer location in the cell buffer FIFO 410. As previously discussed, each packet, shown in FIG. 7, contains header data 800 and payload data 920. A micro-engine, as previously discussed, writes the header data 800 to a buffer in the cell buffer FIFO 410. The payload data 920 may be then read from the memory controller 50 or host and may be written into the buffer in the cell buffer FIFO 410. This payload data 920 may be read from any number of host addresses via host data bus 500, shown as bus 350 in FIG. 2, and can come as a large burst or a single byte at a time. The cell buffer BAL 310 ensures the payload data 920 is placed in the correct location of the buffer in the cell buffer FIFO 410.

Still referring to FIG. 4, in order to determine which of the eight bytes are valid, a starting byte lane, shown in FIG. 5A, and the number of bytes valid are passed to the cell buffer byte alignment logic along with the data using host start lane bus 510 and host byte valid bus 530, respectively. The cell buffer BAL 310 also keeps track of alignment of four packets at a time by having a cell byte counter 550 for each micro-engine buffer. Since there are two micro-engines, DMA packet controller SQ 210 and DMA packet controller RQ 220, and each may have at least two buffers contained therein, a total of four counters are required within byte counter 550. The host or memory controller 50 returns control information via host engine and task bus 540 and host write enable 520 with each read to enable the correct counter.

Still referring to FIG. 4, a shift selector 560 receives the start lane 610 via the host start lane bus 510 and the current location of the buffer pointer and then determines how many bytes to shift the incoming host data. This must be done so the first valid byte of payload data 920 may be written to the first available byte location in the appropriate buffer of the cell buffer FIFO 410.

For example, as shown in FIG. 5A, data 620 arrives in eight bytes segments starting with byte lane 0 through byte lane 7. The first valid bit starts in byte lane 3 and ends in byte lane 7. However, as shown in FIG. 5B, the first available location in a cell buffer located in cell buffer FIFO 410 starts in byte lane 4. Byte lanes 0 through 4 already contain valid data for another task associated with a micro-engine or a memory controller 50. Therefore, writing the valid bytes, as shown in FIG. 5A, would overwrite byte lane 3 in the buffer of the cell buffer FIFO 410, as shown in FIG. 5B.

Therefore, in the example shown in FIGS. 5A and 5B the shift selector 560 determines that the incoming payload data 920 has to be shifted by 1 byte location so that h0, shown in FIG. 5A, which is in byte lane 3, needs to be shifted to byte lane 4. Further, the last valid byte from host, h4, does not fit on the current line of data 620 of the cell buffer FIFO 410. Therefore, the cell buffer BAL 310 must remember that when the next line of data 620 is written to the buffer in cell buffer FIFO 410 that the last remaining byte h4 must be written to start lane 610 position 0 of the next line. If data is provided in a bursting mode it will be written along with data from the next read. However, if this is the last read from host, the cell buffer BAL 310 writes the data on the next clock cycle.

Still referring to FIG. 4, the data shift multiplexer 570 takes the read payload data 920 and shifts it accordingly as shown in FIG. 5C. Further, the data shift multiplexer 570 registers the bytes of data 620 that will be written to the next line in the next clock cycle. Therefore, as shown in FIG. 5C, data 620 line labeled write #1 has starting in start lane for the newly written data with the last byte thereof contained in data 620 line labeled write #2 in byte lane 0. This data 620, via cell buffer write data 600, along with the write enable 610 generated by the data shift selector 570 go directly to the cell buffer FIFO 410 in bus 340 shown in FIG. 2.

The cell buffer BAL 310, shown in FIG. 4, by maintaining counters in byte counter 550 for each of the two micro-engines and associated tasks eliminates the need for alignment logic for each packet, thereby reducing the gate count required for performing alignments and reducing the die area required for the chip and reducing costs. Further, the cell buffer BAL 310 enables the bursting of data. Therefore, no latency occurs in remembering data for the next data 620 line of the buffer cell FIFO 410 as the subsequent read from the host or memory controller 50 may be processed. During a burst the left over data 620 byte from the previous read may be appended to the new read on the fly. At the end of a burst, only one clock cycle may be needed to write any left over data 620 before the next burst can begin. Also, the cell buffer BAL 310 can also process interleaved payload data 920 for four packets simultaneously. Control signals provided in host data bus 500, host start lane 510, host write enable 520, host byte valid bus 530, and host engine and task bus 540 are passed along with the payload data 920 to direct the payload data 920 to the correct buffer in cell buffer FIFO 410. The result is a high throughput implementation for four packets with only one cell buffer BAL 310 required.

Figure 6:
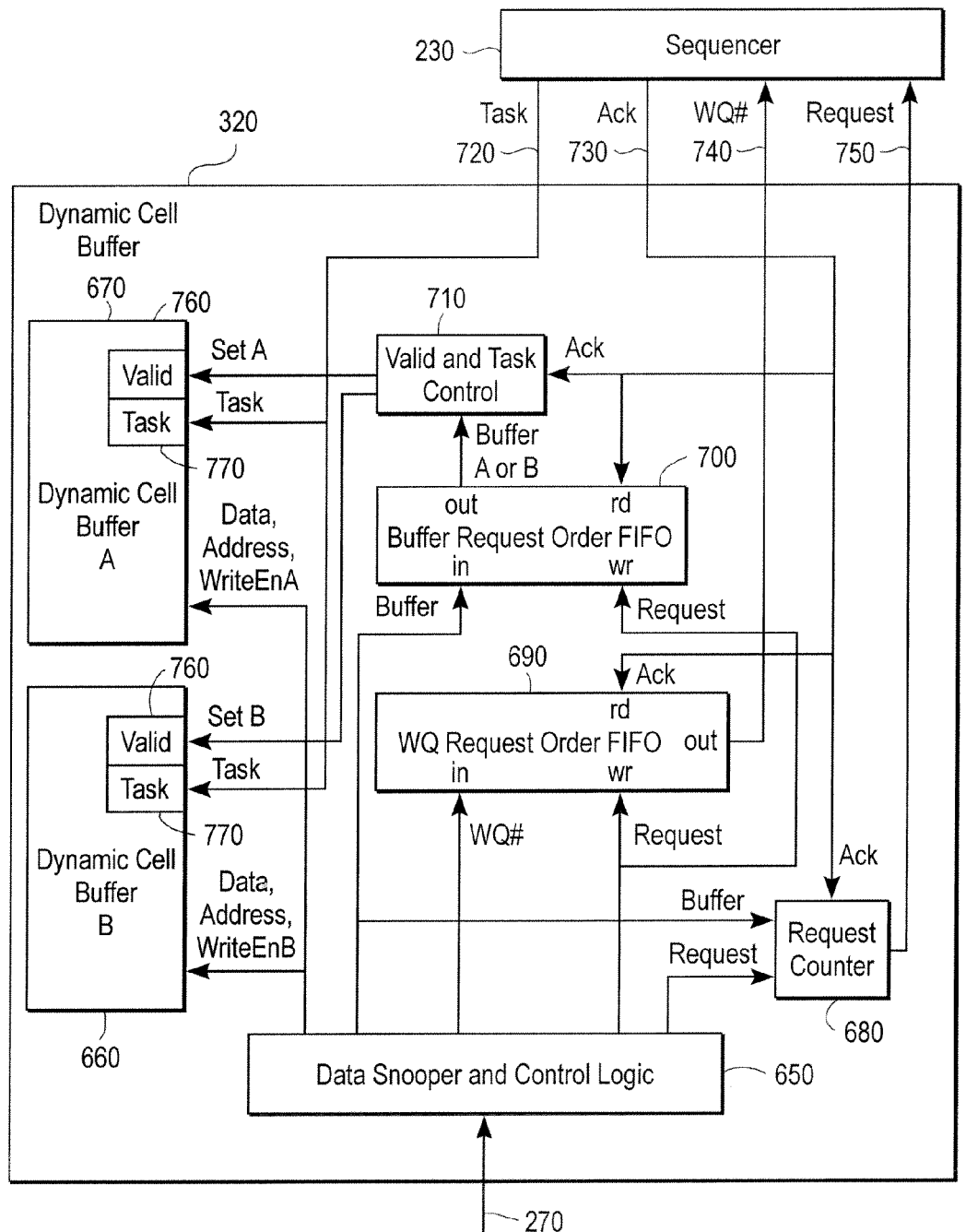
FIG. 6 is a dynamic cell buffer circuit found in a DMA packet controller sending queue (SQ) and the receiving queue (RQ) of the DMA packet engine, shown in FIG. 2, as used in the example embodiments of the present invention.

FIG. 6 is a dynamic cell buffer circuit found in a DMA packet controller sending queue (SQ) 210 and the receiving queue (RQ) 220 of the DMA packet engine 65, shown in FIG. 2, as used in the example embodiments of the present invention. As previously discussed, there are two micro-engines located in the DMA packet engine 65. These micro-engines are the DMA packet controller SQ 210 and the DMA packet controller RQ 220. In each micro-engine there exists a dynamic cell buffer 320, shown in FIG. 6. Each micro-engine has multi-tasking capability that allows it to work on two packets at the same time. Each task executing in a micro-engine may only process a single packet. Further, sequential packets within the same work queue may only be received and processed in order. Therefore, each micro-engine may not assign the same task to both buffers or work on two patents with the same work queue at the same time. Whenever a packet is received, the micro-engine determines if it is busy with a particular buffer or work queue. If the micro-engine is not busy, the micro-engine then checks to determine if a task is available to process a new packet. If a task is available the micro-engine then assigns the task to process a packet and thus the task becomes unavailable for processing in the other jobs. Once processing of the packets is completed by a particular task, that task becomes available to process other jobs. In this manner no task within a micro-engine is tied to a particular buffer. This enables a task to access dynamic cell buffer A 670 or dynamic cell buffer B 660. With this flexibility the necessity for any additional buffers may be eliminated as cost and space savings may be realized.

Referring to FIG. 6, data enters the dynamic cell buffer 320 via the SIB receive bus 270 and may be received by the data snooper and control logic 650. One of the functions of the data snooper and control logic 650 may be to extract the destination work queue number 840, discussed in further detail in FIG. 7. The data snooper and control logic 650 indicates to a request counter 680 that data has been received from the SIB receive bus 270. The request counter 680 counts the number of requests received from the data snooper and control logic 650. In turn, the request counter 680 transmits the request to sequencer 230. Sequencer 230 determines if a task 720 may be available. If a task is available, sequencer 230 returns an acknowledgement 730 to request counter 680, valid and task control 710, buffer request order FIFO 700, and work queue (WQ) request order FIFO 690. This acknowledgement and assignment of a task to a work queue number will be discussed in further detail ahead.

Figure 7:
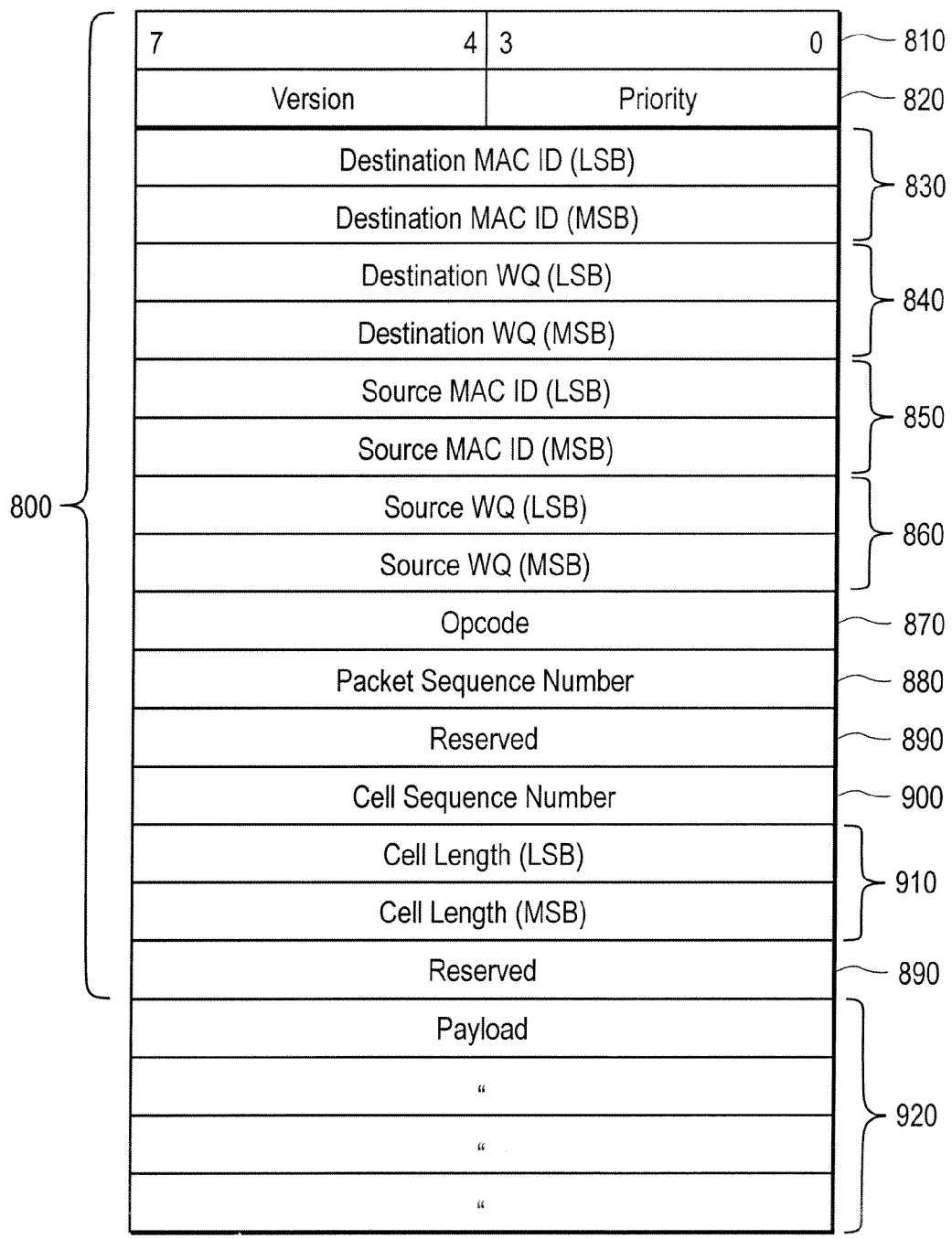
FIG. 7 is an example data packet having a header portion and a payload portion as used in the example embodiments of the present invention.

Also upon receipt of data by the data snooper and control logic 650 the work queue number 840, shown in FIG. 7, may be transmitted to the WQ request order FIFO 690 along with a request for assignment of a task. The work queue number 840 extracted from header data 800 received by data snooper and control logic 650 may be then transmitted to the sequencer 230 by the WQ request order FIFO 690. The sequencer 230 now has a request for a task and the work queue number for the latest packet received. Sequencer 230 tracks the assignments of tasks to work queue numbers and if a task 770 is available, the sequencer 230 will assign a task 770 to the work queue number. As previously discussed, the sequencer 230 will send an acknowledgement 730 to the request counter 680. This acknowledgement 730 to request counter 680 indicates that the previous request has been acknowledged and a task has been assigned. If the request counter 680 has another task to be assigned it will then transmit that request to the sequencer 230.

Still referring to FIG. 6, as previously discussed, in addition to the sequencer 230 transmitting acknowledgement 730, it also transmits an acknowledgement to the work queue request order FIFO 690 to indicate it has assigned the previous work queue number to a task and that if the work queue request order FIFO 690 has any further work queue number 840 that needs a task assigned it should be transmitted. In addition, acknowledgment 730 may be transmitted to the buffer request order FIFO 700. The buffer request order FIFO 700 determines which buffer may be available and transmits that buffer identification, either dynamic cell buffer A 670 or dynamic cell buffer B 660, to the valid and task control 710 circuit. The valid and task control 710 circuit also receives acknowledgement 730 and sets the appropriate valid bit 760 in either dynamic cell buffer A 670 or dynamic cell buffer B 660 depending upon the buffer identification received from the buffer request order FIFO 700. The valid bit 760 serves to indicate a valid task has been assigned to the particular buffer, either dynamic cell buffer A 670 or dynamic cell buffer B 660, and therefore the buffer now contains a valid packet and is not available until cleared. Once valid bit 760 is set and task 770 is assigned the processing of the packet received through SIB receive bus 270 continues.

Therefore, the dynamic cell buffer 320 has the ability to snoop, using the data snooper and control logic 650, the incoming packet header data 800 information to allow packet processing to begin after the second line of buffer data is transferred. In each clock cycle, eight bytes of data are transferred from the SIB receive bus 270 and sent to one of the Dynamic Buffers, either dynamic cell buffer A 670 or dynamic cell buffer B 660. The Media Access Controller (MAC) identifier is in the first 16 bytes of the header data 800. As soon as the destination work queue number 840 is snooped from the header 800, a micro-engine task assignment may be requested. On a full size cell it takes 37 clock cycles to transfer the cell. Since the request can be made within three clock cycles after the cell starts transferring, this reduces latency by 34 clock cycles. Normal packet processing may take approximately 100 clock cycles so this represents a 30% savings in packet processing clock cycles.

Further, the dynamic cell buffer 320 by starting the allocation early may be able to load context registers (not shown) for the work queue to be processed while the packet is streaming into the dynamic cell buffer 320. There are registers (not shown) related to every work queue that are required to process a packet. After a packet is processed and before the task may be released for the buffer, the context may be updated in expectation that the next packet may not be for the same work queue. The context may be stored until a packet of the same work queue is received again causing the context to be read allowing the packet to be processed with the most current information. Allowing this loading to occur while the packet is streaming in allows parallelism in accomplishing this function. This may save approximately five clock cycles of latency for every packet processed.

FIG. 7 is an example header data 800 portion of a packet utilized by the embodiments of the present invention. The table shown in FIG. 7 is divided into rows holding eight bits per row as shown in data row 810. The first row of the header consists of a version identifier of the NGIO architecture 10, or other type of packet switched network, being used in bits 4 through 7 and a priority for this packet in bits 0 through 3 in row 820. A destination Media Access Controller Identification (Macid) 830 is divided into two rows in which the least significant bits (LSB) appear in the first row and the most significant bits appear in the second row. The destination Macid 830 is used to indicate which port this packet is to be delivered to. Thereafter, there appears in the packet header data 800, a destination work queue (WQ) 840 divided into a LSB portion and a MSB portion. The destination WQ 840 is used to identify a unique work number assigned to this connection it was established. Further, a source Macid 850 is provided to indicate the source of this Header data 800 and is also divided into a MSB portion and a LSB portion. A source WQ 860 is provided in Header data 800 to indicate the work queue in the source from which the data packet originated. When the destination WQ 840 and the source WQ 860 are equal to 0, this indicates to the HCA 60 or TCA 90 that this particular packet is requesting an acknowledgment from this particular port so that the network may be configured by the switch fabric 70, shown in FIG. 1. The remainder of the header data 800 of the packet includes an operation code (Opcode) 870 indicative of the operation to be performed. A packet sequence number 880 is used to properly order packets arriving out of sequence. Two reserved rows 890 are provided for future usage. In addition, a cell sequence number 900 and a cell length 910 is further provided. Finally, the payload 920 is also illustrated in the figure. It should be noted that the payload is typically 256 bytes long, but that any size payload may be utilized.

Figure 8:
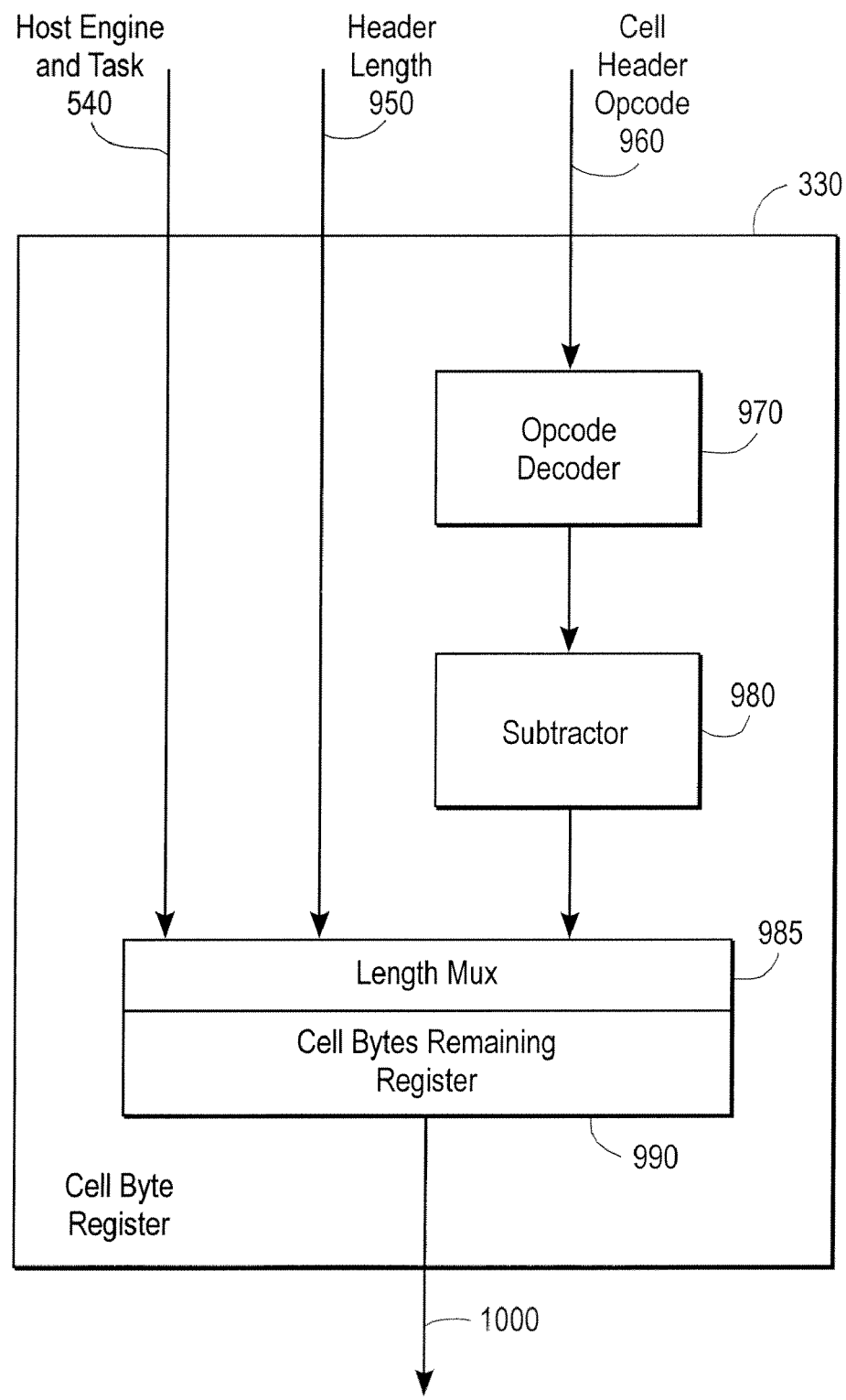
FIG. 8 illustrates a cell byte register contained in the DMA packet controller SQ and RQ, as shown in FIG. 2, and used in the example embodiments of the present invention.

FIG. 8 illustrates a cell byte register 330 contained in the DMA packet controller SQ 210 and RQ 220, as shown in FIG. 2, and used in the example embodiments of the present invention. The cell byte register 330 is a hardware implementation that processes the header 800 cell length 910 of an incoming packet and generates the total number of payload data bytes. It is also used as a readable/writeable register by the micro-engines to maintain the number of packet bytes remaining to transfer to memory controller 50 and DRAM 40.

Referring to FIG. 8, there are four components shown within the cell byte register 330. These components include a opcode decoder 970, a subtractor 980, a length multiplexer (MUX) 985, and the cell bytes remaining register 990. The opcode decoder 970 parses the MAC cell header data 800 opcode 870 to determine the type of transaction. Each opcode 870 has a fixed value of control data bytes. This control field length calculated is subtracted from the cell length 910. The result is then loaded into the cell bytes remaining register 990. The micro-engine source address and data are snooped in the opcode decoder to intercept the cell header length. This allows the cell bytes remaining register to be updated with the payload byte count without intervention of the micro-engine.

The length MUX 985 allows multiple sources to be loaded into the cell bytes remaining register (CBRR) 990. This allows the cell length 910 to be snooped and loaded into the CBRR 990. After the cell header length is loaded, the opcode 870 is decoded and the appropriate byte count is subtracted. The updated value is then loaded back into the CBRR 990. The micro-engine also has access to the CBRR 990. When the micro-engine is ready to transfer the payload data 920 to the memory controller 50, it needs to keep track of how many bytes are remaining to transfer since the micro-engine cannot always transfer the complete payload in one transaction. In this case the micro-engine must read the CBRR 990 and subtract the amount of the transfer. The CBRR 990 now reflects the amount that has not yet transferred. The transfers continue until the CBRR 990 is equal to 0.

The payload 920 byte count is calculated in hardware using the cell byte register 330, thus offloading the micro-engine. The micro-engine would have to do the same computations as the hardware in the cell byte register 330 to get the payload byte count if this cell byte registered 330 is not implemented. This may take the micro-engine fifteen clock cycles to calculate. The average processing time for a packet approximately 100 clock cycles, thus this represents a 15% decrease in performance if the micro-engine does the calculation.

The cell bytes remaining register 990 has two functions. It provides the payload 920 byte count and is used for keeping track of the number of payload 920 bytes that need to be transferred to memory controller 50 and DRAM 40. Typically, the micro-engine would copy the payload byte count into another register that can be read and written. This register would be used as the cell bytes remaining register. This requires another register address for the micro-engine and also costs a clock cycle to move the cell payload byte count into the cell byte remaining register. Using the cell byte register 330 this equates to saved micro-engine cycles. Therefore, the micro-engine is free to do other processing functions instead of processing the cell byte count.

The benefit resulting from the present invention is that packets of information may be generated and transferred from one device to another in an efficient and rapid manner. Further, the amount of storage space required for temporary storage of packets is kept to an absolute minimum. In addition, buffers may be immediately written to when a line of data has been read therefrom. Therefore, there is no need to wait a buffer to empty before refilling it. Also, the logic required to implement the present invention is simple and therefore occupies a minimal amount of die area.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

We claim:

1. A device comprising:

micro-engines to receive a packet, determine if a task is available to process the packet, and to assign the task and a buffer to store the packet, said micro-engines comprising:

first circuitry to extract from a packet header comprising the packet a value representing a queue, and to signal a sequencer that a micro-engine task and cell buffer are to be assigned for the packet; and second circuitry to extract an opcode for the packet header, determine a number of bytes in the packet header, to determine a number of bytes in the packet payload, and to determine a number of bytes available in the cell buffer.

2. The device of claim 1, wherein the first circuitry comprises:

third circuitry to receive the packet and transmit a request that the micro-engine task be assigned to process the packet.

3. The device of claim 2, wherein:

the sequencer is capable of receiving the request that the micro-engine task be assigned to process the packet identifying if the micro-engine task is available to process the packet, and assigning the micro-engine task and the cell buffer to the packet.

4. The device of claim 3, wherein the first circuitry also comprises:

a counter to count a number of packets received by the third circuitry and to transmit to the sequencer another value representing the number of packets received by the third circuitry; and first-in-first-out (FIFO) circuitry to receive the value representing the queue and to transmit to the sequencer the value representing the queue.

5. The device of claim 1, wherein the second circuitry comprises:

third circuitry to determine based upon the opcode a length of the packet header.

* * * * *